(No Model.)
2 Sheets—Sheet 1.
T. B. FOGARTY.
PROCESS OF AND APPARATUS FOR MAKING AMMONIA.
No. 371,187. Patented Oct. 11, 1887.
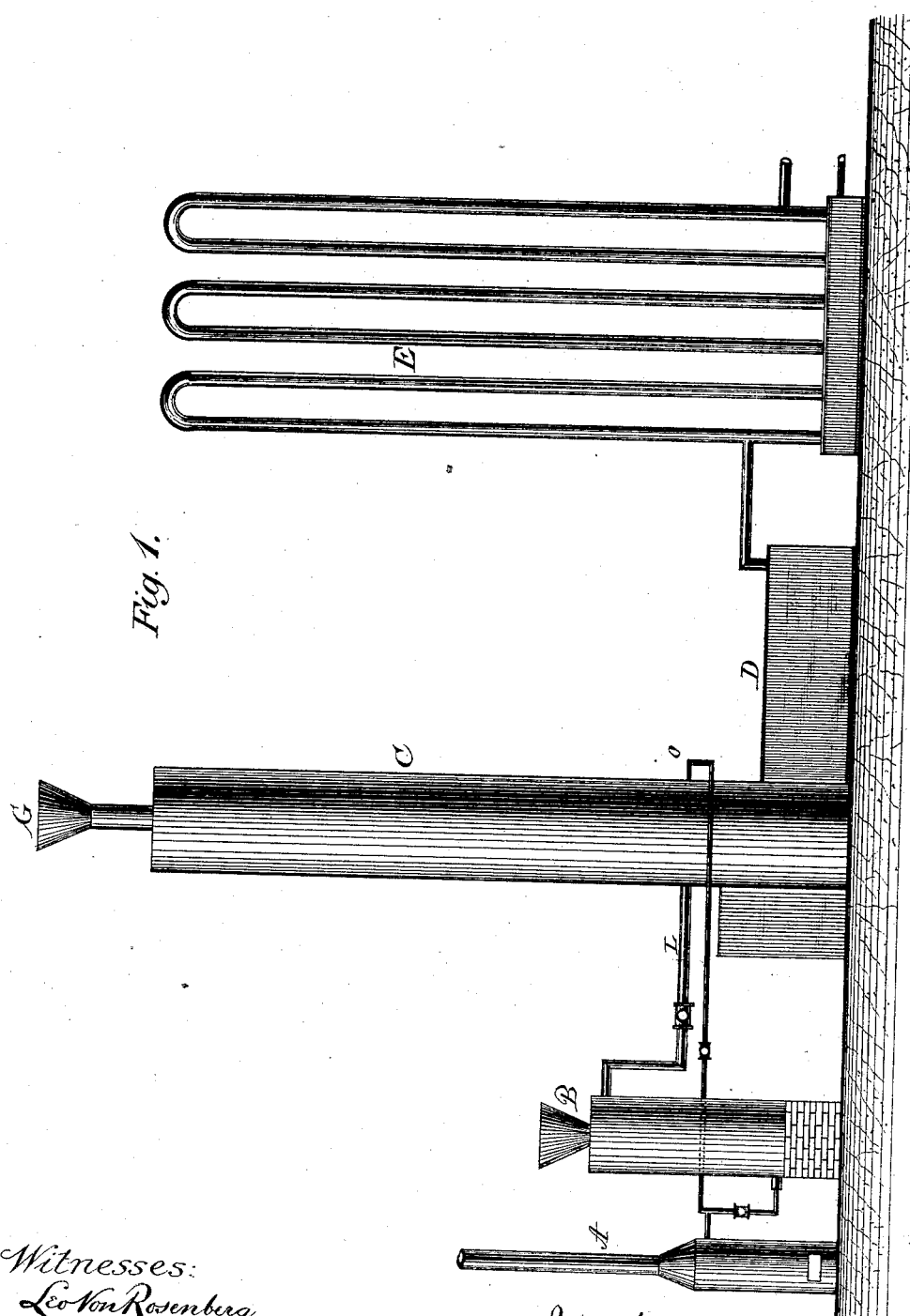

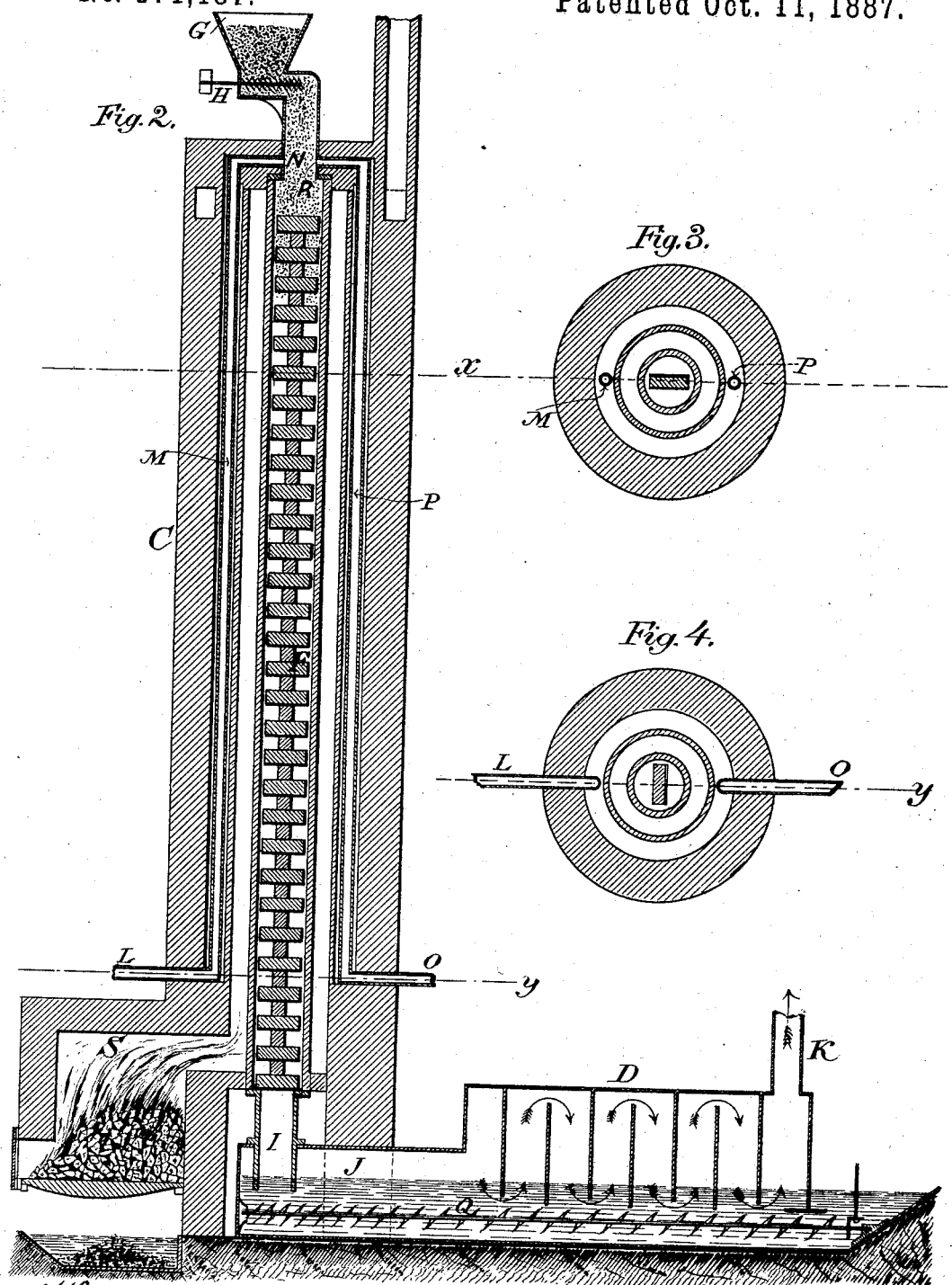

UNITED STATES PATENT OFFICE.

THOMAS B. FOGARTY, OF BROOKLYN, ASSIGNOR TO JOHN A. BALESTIER, TRUSTEE, OF NEW YORK, N. Y.

PROCESS OF AND APPARATUS FOR MAKING AMMONIA.

SPECIFICATION forming part of Letters Patent No. 371,187, dated October 11, 1887.

Application filed October 16, 1886. Serial No. 216,466. (No model.)

*To all whom it may concern:*

Be it known that I, THOMAS B. FOGARTY, of the city of Brooklyn, county of Kings, and State of New York, have invented a new and useful Process of and Apparatus for Manufacturing Ammonia; and I hereby declare the following to be a full, clear, and exact specification of the same, reference being had to the accompanying drawings, forming a part of this specification.

The object of my invention is to obtain ammonia by a simple and economical process from atmospheric nitrogen and the hydrogen of decomposed steam.

It is well understood that ammonia cannot be practically produced upon a large scale by the direct synthesis of its elements; but it is at the same time well known that there is no practical obstacle in the way of the artificial production of cyanogen, and that this having been produced, as an intermediate step, its conversion into ammonia is an easy matter. It is well known, also, that it is extremely difficult to effect the combination of nitrogen and carbon—the elements of cyanogen—and to form free cyanogen gas even at a high temperature. If, however, an alkali or alkaline earth, or, indeed, any substance capable of combining with cyanogen or of producing a substance capable of combining with it, be present, cyanogen is readily produced from its elements and combines with the alkali to form therewith a cyanide or cyanate, which in turn may be decomposed by steam with the production of ammonia, oxides of carbon, and hydrogen gas. Taking advantage of this disposition of incandescent nitrogen and carbon to combine in the presence of an alkali, I submit a suitably-prepared mixture of carbon and alkali to the action of nitrogenous gas in a close furnace or retort, and simultaneously with such gas, or mixed therewith, I also introduce into my retort a suitable volume of steam, preferably superheated, whereby the cyanides resulting from the combination of the nascent cyanogen with the alkali may, as fast as formed, be decomposed by the steam with the production of ammonia, oxides of carbon, and hydrogen gas, the alkali returning to its original state or entering into fresh combinations. The nitrogen used may be derived from any suitable source; but I prefer to obtain it from the nitrogenous gas produced by the partial combustion of coal, coke, or any other suitable form of carbon in a closed furnace or cupola.

I shall now proceed to describe my invention so fully and clearly that any person skilled in the art of making ammonia may be able to understand and practice the same, and for this purpose I shall divide or classify it into two heads or parts, consisting, first, in obtaining nitrogen either pure or as contained in nitrogenous-fuel gas, and, second, in converting such nitrogen into ammonia by causing it to combine with hydrogen.

In carrying out the first part of my invention I prefer to make a nitrogenous-fuel gas by forcing air, either alone or mixed with steam, through a suitable cupola, furnace, or retort filled or charged with coal or coke or other carbonaceous fuel in a state of combustion or incandescence.

My second step consists in the conversion, either in whole or in part, of the nitrogen of the nitrogenous gas into ammonia; and it consists in causing the gas to pass through a cupola, furnace, or retort, wherein it meets with adjusted currents or moving volumes of mixed carbon and alkali in a pulverized or finely-divided state, and steam, preferably superheated, and wherein the mixed volume of nitrogenous gas, alkalized carbon, and steam is subjected to a high or incandescent temperature, under the influence of which the alkalized carbon combines with the nitrogen of the gas to form alkaline cyanides, which are in turn decomposed by the steam with the production of ammonia, oxides of carbon, and hydrogen gas, while the combined alkali returns to its original state or enters into fresh combinations.

The annexed drawings illustrate and are a part of this specification.

In Figure 1, which shows in elevation the general arrangement and form of my apparatus, A is a steam-boiler of any suitable construction; B, a cupola or furnace for producing nitrogenous gas; C, a furnace for the conversion of the nitrogen of the nitrogenous gas into ammonia; D, a washer wherein the solid matter escaping from C is separated from the gas; and E, a condenser, wherein the gas, now largely impregnated with ammonia, is cooled preparatory to the separation and collection of the ammonia.

In Figure 2, which is a vertical section of C and D, Fig. 1, F is a vertical cupola or retort provided at top with a hopper, G, provided with a feeding-screw, H, for feeding the alkalized carbon into the retort F, which is filled with shelves or bafflers, by means of which the downward passage of the alkalized carbon through the retort is retarded. I is the outlet from the retort F, and is sealed in the liquid contained in the hydraulic main J. D is a washer, in which the gas is freed from such dust as may adhere to it, and whence the gas passes through the outlet K to the condenser E, where it is cooled preparatory to the contained ammonia being separated and collected by any of the usual processes. L is the inlet for the admission of nitrogenous gas to a superheater, M, whence it enters the retort F at N. O is an inlet for the admission of steam to a superheater, P, whence it enters the retort F at R. S is a furnace of any suitable construction for heating the cupola F.

Figs. 3 and 4 are sections of Fig. 2 on the lines $x$ and $y$, respectively.

The mode of operation is as follows: I first force air alone, or air and steam mixed, through a suitably-constructed cupola or furnace, B, containing incandescent coal, coke, or charcoal, or any other form of carbon in a state of incandescence, and thereby produce a fuel-gas containing a large percentage of nitrogen. I now cause my nitrogenous gas to pass through the pipe L into a superheater, M, wherein it is raised to a high or incandescent temperature. From the superheater M my gas passes into a retort, F, which is maintained at a high or incandescent temperature by the furnace S, and wherein it meets with a suitable volume of steam, preferably superheated by means of the superheater P. The mixed volume of gas and steam now encounters a volume of pulverized carbon and alkali, which is fed into the retort continuously by means of the screw H from the hopper G, whereupon the mixed volume of gas, steam, and pulverized material passes downward through the retort, wherein it is raised to and maintained at a uniformly-high temperature, the consequence of which is that the nitrogen of the gas unites with the carbon and alkali to form cyanides and cyanates therewith, and these in turn are immediately decomposed by the steam present, producing ammonia, oxides of carbon, and hydrogen gas, while the alkali is set free and returns to its original state or enters into fresh combinations. I am careful that the volume of steam used may be largely in excess of that required for the mere decomposition of the cyanides and the resulting production of ammonia, because I am thus enabled, through the decomposition of the steam by the pulverized carbon, to increase both the volume and quality of my resulting gases to any desired extent, and with the additional advantage of furnishing to any desired extent, either in the form of fuel-gas or of undecomposed steam, a gaseous envelope sufficient for the protection and preservation of my ammonia, which might otherwise be destroyed by contact with the heated surfaces of the interior of the retort. My gaseous products and undecomposed solid matter now escape from the retort through the outlet I and pass into a suitable hydraulic main, J, wherein they become partially separated, the heavier portion of the solid matter remaining in J, while the gaseous mixture passes onward through the washer D, wherein the floating particles of dust which still adhere to it are washed out, and whence it escapes into the condenser or other suitable cooling apparatus, E, wherein it is cooled and prepared to have the contained ammonia separated from the other gases by means of scrubbers or other suitable appliances. The solid matter which collects in the hydraulic main and washer may be removed by the screw Q.

It is evident that the superheaters M and P may be dispensed with, as the gaseous and pulverulent volume descending through the retort would, under ordinary circumstances, soon become raised to a high temperature by the heat of the retort itself; but the effect of this would be to throw so much more work upon the retort, the effectiveness of which would be diminished to a corresponding extent; and, consequently, it is most desirable that the gas and steam should be both raised to as high a temperature as practicable before entering the retort. It is also evident that the gas and steam may without disadvantage be mixed before being superheated.

I do not bind myself to the exact process, or succession of processes, or to the exact form of apparatus described, for it is evident that they may be varied indefinitely.

I am aware that in my previous patents, No. 254,204, dated February 28, 1882, No. 261,698, dated July 25, 1882, Nos. 265,792 and 265,793, each dated October 10, 1882, and Nos. 288,323 and 288,324, each dated November 13, 1883, I have described processes and apparatus for manufacturing gas and producing ammonia more or less approaching in resemblance the improved process and apparatus herein described, and I disclaim in this application any inventions described in said enumerated patents.

What I claim, and desire to secure by Letters Patent, is—

1. The process of producing ammonia, consisting in forcing air or air and steam over and through incandescent carbonaceous fuel in a close furnace, next in introducing the nitrogenous gas thus produced and steam simultaneously into another retort, where both the gas and the steam are superheated, and causing them to combine therein and to encounter and accompany falling volumes of pulverized carbon and alkali throughout the same retort, the combined gases and the carbon and alkali being maintained at the same high or incandescent temperature, thereby producing in the passage cyanides and cyanates, which are immediately decomposed by the steam present in the combined gases, and then in passing the products through a purifier into a condenser, where the products are cooled and the contained ammonia is ready for separation, substantially as described.

2. In producing cyanides and cyanates from the nitrogen of nitrogenous gas by the combination of such gas with steam and carbon and alkali in the same retort, the sub-process of superheating the nitrogenous gas and the steam in the same retort through which the pulverized material is falling, substantially as described.

3. In producing cyanides and cyanates from the nitrogen of nitrogenous gas by the combination of such gas with steam and pulverized carbon and alkali in the same retort through which the pulverized material is falling, the sub-process of superheating the retort through which the pulverized material is falling, so that the combined gases and the pulverized material are maintained substantially at the same high temperature while passing through the retort, substantially as described.

4. In producing cyanides and cyanates from the nitrogen of nitrogenous gas by the combination of such gas with steam and pulverized carbon and alkali in the same retort through which the pulverized material is falling, the sub-process of introducing the steam into the same retort in a greater volume than is required for the purpose of decomposition, substantially as and for the purposes described.

5. In producing cyanides and cyanates from the nitrogen of nitrogenous gas by the combination of such gas with steam and pulverized carbon and alkali in the same retort through which the pulverized material is falling, the sub-process of introducing the steam in excessive volumes simultaneously with the nitrogenous gas in the same superheated retort and at about the same point thereof, substantially as described.

6. In an apparatus for producing ammonia, the combination of the inclosed retort K, the superheating-chambers M and P, which entirely surround such retort, the gas-pipe L, and steam-pipe O, arranged in immediate proximity to the superheating-chambers, all constructed and arranged substantially as and for the purpose described.

7. In an apparatus for producing ammonia, the combination of the inclosed retort K, the superheating-chambers M and P, which entirely surround such retort, the gas-pipe L, and steam-pipe O, arranged in close proximity to the superheating-chambers, and the hopper G, provided with a feeding-screw, H, all constructed and arranged substantially as described.

8. In an apparatus for producing ammonia, the combination of the inclosed retort K, the superheating-chambers M and P, the gas-pipe L, steam-pipe O, the hopper G, and the hydraulic main J and its extracting-screw, all constructed and arranged substantially as described.

In testimony whereof I have signed my name to this specification before two subscribing witnesses.

THOS. B. FOGARTY.

Witnesses:
  EDWIN F. COREY,
  ALBERT B. VAN WINKLE.